(12) United States Patent
Silberman

(10) Patent No.: US 6,643,065 B1
(45) Date of Patent: Nov. 4, 2003

(54) VARIABLE SPACING DIFFRACTION GRATING

(76) Inventor: Donn Michael Silberman, 31 Blackbird La., Aliso Viejo, CA (US) 92656

( * ) Notice: Subject to any disclaimer, the term of this patent is extended or adjusted under 35 U.S.C. 154(b) by 0 days.

(21) Appl. No.: 09/765,876

(22) Filed: Jan. 18, 2001

(51) Int. Cl.$^7$ .............................. G02B 5/18; G02B 26/02
(52) U.S. Cl. ...................... 359/573; 359/569; 359/575; 359/230; 359/231
(58) Field of Search .............................. 359/566, 565, 359/573, 569, 574, 230, 231, 232

(56) References Cited

U.S. PATENT DOCUMENTS

| | | | |
|---|---|---|---|
| 4,736,132 A | 4/1988 | Culp | 310/333 |
| 5,096,285 A | 3/1992 | Silberman | 351/161 |
| 5,115,344 A | * 5/1992 | Jaskie | 359/573 |
| 5,178,636 A | 1/1993 | Silberman | 623/6 |
| 5,625,729 A | * 4/1997 | Brown | 359/573 |
| 5,757,536 A | 5/1998 | Ricco et al. | 359/224 |
| 5,905,571 A | 5/1999 | Butler et al. | 356/328 |
| 5,999,319 A | 12/1999 | Castracane | 359/573 |

OTHER PUBLICATIONS

Palmer, C., "Diffraction Grating Handbook," 4$^{th}$ Edition, 2000 (entire book).

Sinclair, M. et al., "Synthetic spectra: a tool for correlation spectroscopy," Applied Optics/ vol. 36, No. 15/ May 20, 1997, pp. 3342–3348.

Http://www.nn.doe.gov (web site) "Program Area Overview—Nonproliferation and National Security," http://sbir.er.doe.gov/sbir/cycle18/phase1/sol/nn.htm, Dec. 12, 1999, pp. 1–10.

German, J., "Remote sensor will analyze gas from one to two miles away, Polychromator uses combination of optics and MEMS," Sandia National Laboratories, vol. 51, No. 16, Aug. 13, 1999.

Sandia National Laboratories (web page), "Synthetic Spectra, Synthetic Spectra for Remote Chemical Sensing," Fact Sheet, pp. 1–3.

Sandia National Laboratories (web page), "Polychromator to us a combination of optics and MEMS," http://www.sandia.gov/media/NewsRel/NR1999/sensor.htm, News Release Aug. 16, 1999 Feb. 6, 2000, pp. 1–4.

Sandia National Laboratories (web page), "SAMPLES Program Overview," http://www.mdl.sandia.gov/scripts/SAMPLE_about.asp, Aug. 3, 1999, pp. 1–8.

Sandia National Laboratories (web page), "MEMS Overview," http://www.mdl.sandia.gov/micromachine/overview.html, Aug. 3, 1999, pp. 1–12.

(List continued on next page.)

*Primary Examiner*—Audrey Chang
(74) *Attorney, Agent, or Firm*—Fulwider Patton Lee & Utecht, LLP

(57) ABSTRACT

A variable spacing diffraction grating is fabricated using micro-electromechanical (MEMS) technology. An array of interconnected beam elements is fabricated into a diffraction grating and mounted in such a manner that one or both ends of the array of beam elements may be actuated using a mechanical actuator. The beam elements may be linear, spiral shaped or arranged in a staircase structure. Applying a force to one or both ends of the array of beam elements changes the spacing of the grating, and presents a different ruling spacing distribution to incoming radiation, thus altering the diffracted angle among individual diffraction orders of the wavelength. Controlling the diffracted signal in this way allows for specific diffraction pass bands to be fixed on a particular detector or a particular area of a detector or optical relay lens or lenses.

9 Claims, 7 Drawing Sheets

OTHER PUBLICATIONS

Huang, L–S. et al., "MEMS Packaging for Micro Mirror Switches," Rockwell Science Center, Thousand Oaks, California 91360, (undated) pp. 1–6.

Pederson, D., "Microphotonics Lab optics," Microphotonics Group at UCD, http://www/ece.usdavis.edu/ultra/WebPage/Microphotonics optics.htm, Sep. 2, 1999.

Bell Labs (web page), "'Seesaw' Switch is First Practical Micro–Electro–Mechanical Optical Switch," http://www-.bell–labs.com/news/1999/february/23/1/html, Sep. 2, 1999, pp. 1–3.

Fiber Optical Alignment (web page), "MST–OPTO," http://www.imc.kth.se/mems/docs/fiberopt.htm, Sep. 2, 1999, pp. 1–4.

BRO–Building Practice Research for Opto– and Microelectronics (web page), "BRO," http://www.imc.kth.se/mems/docs/bro/Welcome.html, Sep. 2, 1999, pp. 1–2.

Laser 2000 New Fibre Optic Products (web page), New Fibre Optics at Laser, Mar. 22, 1999, pp. 1–4.

MEMS Optical—MEMS Tutorial (web page), "How to Benefit from and Use Micro–Opto–Electro–Mechanical Systems—MOEMS," (undated), pp. 1–3.

NewsByte Detail (Web page), "Butterflies guide optical design," Sep. 16, 1999, p. 1.

Qiao, J. et al., "Dense Wavelength–Division Demultiplexer for Optical Networks," Microelectronics Research Center, Department of Electrical and Computer Engineering, University of Texas at Austin, (undated), pp. 1–7.

UCI Technology Outreach Program (Web page), "Prototyping at UCI," (undated), pp. 1–3.

Castracane, J. et al., "Micro–mechanically controlled diffraction: A new tool for spectroscopy," www.intersci.com (web page), (undated), pp. 1–11.

Turkatte, C.A., "Examining the benefits of tunable lasers for provisioning bandwidth on demand," EuroForm–Optical Components Feb. 2001, pp. 1–10.

Solgaard, O. et al., "Deformable grating optical modulator," Optics Letters, vol. 17, No. 9, May 1, 1992, pp. 688–690.

* cited by examiner

VARIABLE SPACING DIFFRACTION GRATING

CROSS-REFERENCE TO RELATED APPLICATIONS

This application is related to U.S. Provisional Application No. 60/164,938, filed Nov. 15, 1999.

FIELD OF THE INVENTION

This invention relates to optical diffraction gratings and, more specifically, to diffraction gratings which have spacings that can varied by application of a mechanical force.

BACKGROUND OF THE INVENTION

Optical diffraction gratings are used in many applications from spectroscopy to fiber optic telecommunication devices to human visual correction. Diffraction gratings are important to these technologies because of their ability to separate, or disperse, polychromatic light into its monochromatic components. These monochromatic components, where visible light is diffracted, may be visible as a rainbow-like image. Generally, a diffraction grating is a collection of reflecting or transmitting elements separated by a distance that is on the order of the wavelength of the light of interest, or some fraction of that wavelength. These elements may be formed by transparent slits in an opaque screen, or by reflecting grooves on the surface of a substrate. Incident light, or more generally, electromagnetic radiation, falling upon a grating will be diffracted by the grating in a predictable manner such that the electric field amplitude or phase, or both, is modified according to the well known grating equation.

Monochromatic light falling upon a grating surface is diffracted into discrete directions, or angles. Each grating slit or groove may be characterized as a small, slit-shaped source of diffracted light. Light diffracted by each groove combines to form a diffractive wavefront such that, for each given spacing between the grooves or slits, the diffracted light from each groove or slit is in phase with the light diffracted from any other facet so that the light combines in a constructive fashion at a specific angle, and in a destructive fashion for other angles.

Typically, diffraction gratings have a fixed period or grating spacing. This fixed grating spacing may be disadvantageous in certain applications because such a grating is only able to diffract frequencies of light incident upon the grating into specific angles. This constraint requires other components of an optical system incorporating such a grating to be controllable to obtain useful and desirable results.

Various attempts at providing variable spacing diffraction gratings have been previously attempted. For example, Interscience, Inc. of Troy, N.Y. manufactures one type of reconfigurable diffraction grating using micro electromechanical system (MEMS) technology. The grating structure consists of a structure having deflectable beams that are manufactured with a thick spacing. This structure is mounted above a common lower electrode. When the lower electrode is energized, selected ones of the deflectable beams are attracted towards the underlying electrodes. Changing the vertical position of the selected beam with respect to other stationary beams presents a different ruling spacing distribution to incoming radiation. By changing this distribution, the diffracted power among individual diffraction orders of the wavelengths is altered.

One of the disadvantages of the above-described prior art system is that it is only capable of delivering a number of grating spacings that are dependent upon the number of deflectable beams that can be deflected. Moreover, such a device requires vertical movement of the deflectable beams which may be limited depending on the construction of the device.

What is needed and has been heretofore unavailable is a diffraction grating having variable spacing capable of being configured to diffract a relatively wide range of incident light wavelengths into variable angles that can be easily and inexpensively manufactured. The present invention satisfies these and other needs.

SUMMARY OF THE INVENTION

The invention provides a variable spacing diffraction grating which allows the spacing between the beam arms, or grating elements, of the grating to be varied to allow the grating to be adjusted to accommodate incident light having varying wavelengths to diffract the incident light into varying angles. Moreover, the variable spacing diffraction grating of the present invention may be manufactured using micro-electronic manufacturing techniques to provide a variable spacing diffraction grating that is relatively inexpensive to manufacture, is trouble free and reliable in use, and that can attain its variable spacing using computer control of micro-actuators.

In one aspect, the present invention includes a series of substantially parallel interconnected beams spaced apart to form a grating having a selected diffraction angle. The grating may be formed on a substrate in such a manner that each beam is free to move in relation to the substrate so that when a force is applied to a beam at one end of the grating, the beams will move in a coordinated manner and the distance between the beams will change to provide a different diffraction angle.

In another aspect of the present invention, the beams of the diffraction grating are formed as vertical bars connected to one another by horizontal members in such a way that the grating resembles a square wave in shape. In this embodiment, one end of the grating may be fixed, with the other end operably connected to an actuator. When the actuator applies a force to the end of the grating, the vertical bars of the grating move together, or farther apart, depending on the direction of the applied force. Alternatively, an actuator may be operably connected to each end of the grating to effect a change in distance between the vertical bars of the grating.

In a further aspect of the present invention, the beams of the variable spacing diffraction grating may be formed as spiral arms that are arranged in parallel adjacency to form a spiral grating. The inner ends of the spiral arms are connected approximately at the center of the spiral. The outer ends of the spiral arms may be connected to an actuator or actuators configured to apply a force on the end or ends of the spiral arms to change the distance, and thus the grating spacing, between the spiral arms.

In yet another aspect of the present invention, the grating may be formed using a plurality of steps arranged in a series of staircases. In this embodiment, each step in a staircase is offset from an adjacent step such that the angle formed by the offset is the blaze angle of the grating. The bottom step of each staircase is connected to the top step of the next staircase in the series. One end of the series of staircases may be fixed, and the other attached to an actuator. Alternatively, both ends may be attached to actuators. When force is applied to an end of the grating, the staircases of steps move closer together or further apart, depending on the direction of force applied. When the staircases move relative to each other, the spacing of the grating increases or decreases accordingly, allowing for the diffraction angle of the grating to be adjusted to diffract light into varying angles and to accommodate wider ranges of incident light wavelengths than current diffraction gratings.

Still another aspect of the present invention provides a reconfigurable dense wavelength division multiplexer utilizing a variable spacing diffraction grating to separate incident light including a range of multiplexed light wavelengths into individual light beams having only one wavelength. The reconfigurable dense wavelength division multiplexer may be adjusted in the field to accommodate varying multiplexed light having varying ranges of wavelengths. The present invention is advantageous in that it allows a technician setting up a telecommunication network utilizing fiber optic elements to use a single device to accommodate a range of multiplexed light where multiple devices would have been required previously.

In still further aspects of the present invention, variable spacing diffraction gratings embodying the present invention are used to construct channel selectable wavelength add/drop modules which may selectively add or drop wavelengths from a multiplexed light beam falling on the grating. Additionally, variable spacing diffraction gratings of the present invention may be used to replace the standard diffraction grating used in any optical device where channel or wavelength selectability would be useful. Such an application would include, besides those already described, for example, a wavelength selectable optical cross-connect. Such a device would allow a cross-connect to accept any range of input light and diffract the light so that any wavelength of input light may be directed to any output port of the cross-connect.

Other features and advantages of the present invention will become apparent from the following detailed description, taken in conjunction with the accompanying drawings, which illustrate, by way of example, the principles of the invention.

DETAILED DESCRIPTION OF THE PREFERRED EMBODIMENTS

The primary function of a diffraction grating in any application is to separate incident light by wavelength. The general operation of the diffraction grating is sensitive to the wavelength of incidental light and input angle and will diffract specific waves of light at specific angles based on the grating design.

Figure 1:
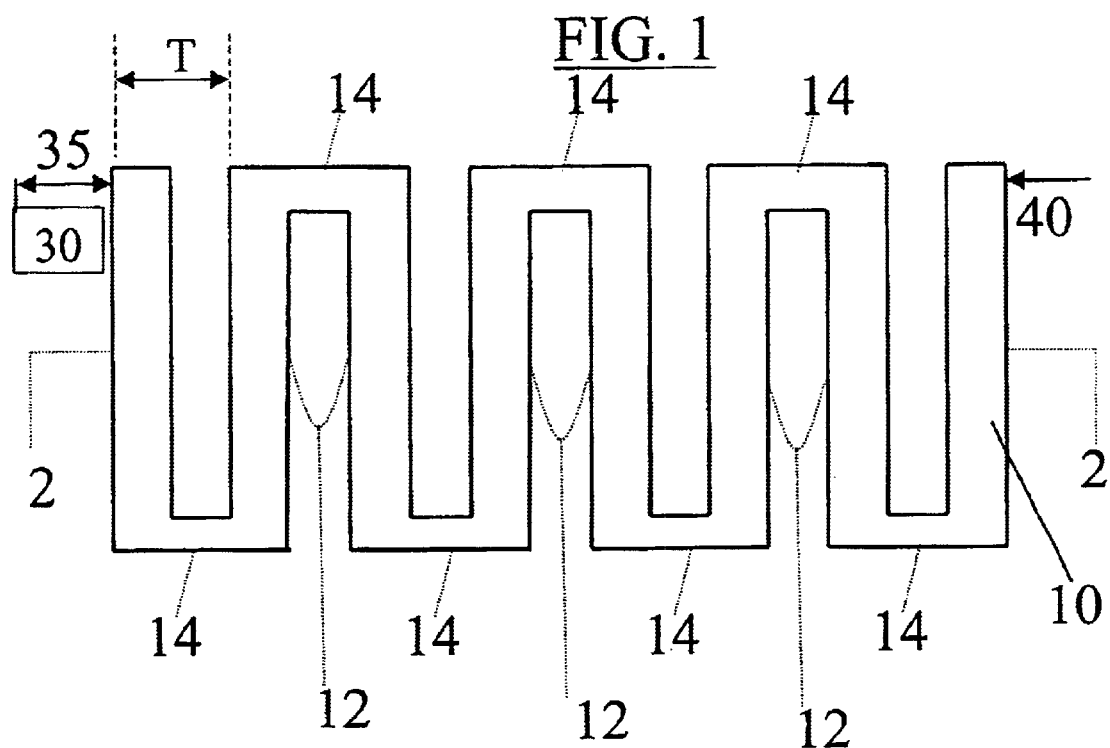
FIG. 1 is a two-dimensional top-view of one embodiment of the variable spacing diffraction grating of the present invention.
Figure 2:
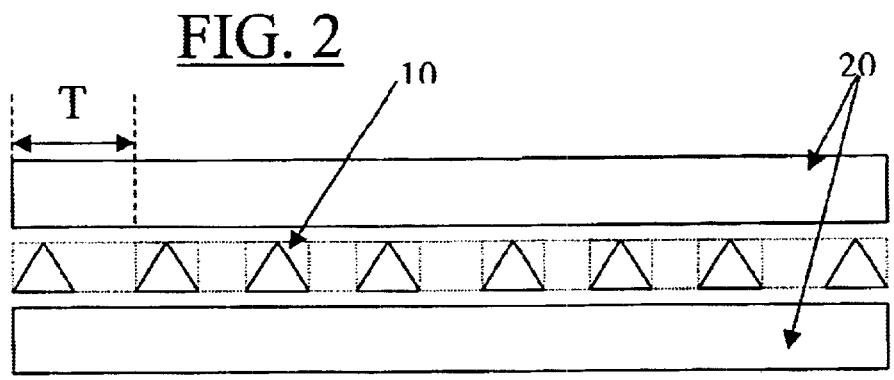
FIG. 2 is a schematic cross-sectional view of the variable spacing grating of FIG. 1.

As shown in the exemplary drawings, the present invention is embodied in a variable spacing diffraction grating having elements that can be mechanically adjusted in such a manner so as to vary the spacing between the diffraction elements, thus providing a variable spacing diffraction grating with the capability of being used to diffract a relatively wide range of incident wavelengths into various angles. This capability is particularly useful for separating incident wavelengths of light such as might be required in applications such as optical spectroscopy or for use with optical waveguides or fiber optic telecommunication networks. One embodiment of the present invention is depicted in FIG. 1 and has a grating element 10 formed using micro electromechanical systems technology, commonly known as MEMS technology. In the embodiment of the present invention depicted in FIG. 1, the grating spacing is indicated by spacing T. In this embodiment, as illustrated in FIG. 2, the variable spacing diffraction grating 10 may be mounted between two base plates 20 to form a device that can be used in a typical fashion to diffract incident wavelengths of light into varying angles.

In a typical embodiment, a variable spacing diffraction grating incorporating the present invention may be formed in the shape of a repeating square wave, as shown in FIG. 1. The square wave thus depicted is constructed of a number of vertical bars or beams 12 connected by horizontal connectors 14. In this embodiment, light is diffracted by the vertical bars 12. The vertical bars 12 and horizontal connectors 14 of variable spacing diffraction grating 10 may be triangular in shape, although other shapes may be used dependent on the requirement of the application using the variable spacing diffraction grating of the present invention. The spacing, or period, between the vertical bars 12 may be constant, with each vertical bar 12 equidistant to an adjacent vertical bar 12, or the spacing between the vertical bars 12 may be variable, depending on the needs of the designer. By way of example, in a typical variable spacing diffraction grating embodying the principles of the present invention, the vertical bars 12 and horizontal connectors 14 of the variable spacing diffraction grating 10 may be formed in a triangular shape, with each side of the triangular vertical bars 12 and horizontal connectors 14 being on the order of 1 micrometer in width. Typically, the period, or spacing between vertical bars 12 is on the order of one micrometer, and the overall length of the variable spacing diffraction grating 10 may be 50 micrometers. It will be obvious to those skilled in the art that the shape of the vertical bars and horizontal arms, the spacing between the vertical bars and length of the grating is not limited to gratings 50 micrometers in length having 1 micrometer wide sides or periods on the order of 1 micrometer and depends only on the needs of the particular application. For example, there is no requirement that the vertical bars 12 and the horizontal connectors 14 have the same shape or dimensions. Further, the width of the vertical bars 12 could change from one end of the grating to the other, either sequentially or non-sequentially, depending on the application for the variable spacing diffraction grating. It should also be understood that while this embodiment of the present invention has been described with reference to vertical bars and horizontal connectors, such reference is made only for convenience, and variable spacing diffraction gratings as described herein operate satisfactorily without regard to the orientation of the grating.

Referring again to FIG. 1, an actuator 30 may be attached to variable spacing grating 10 in such a manner as to allow the actuator to transmit a force to one end of the variable spacing diffraction grating 10 either directly or using a linkage 35. The other end 40 of variable spacing diffraction grating 10 may be either fixed, so that force transmitted either directly or through linkage 35 by actuator 30 to variable spacing diffraction grating 10 causes variable spacing diffraction grating 10 to either collapse or expand depending on the direction of the force transmitted to variable spacing diffraction grating 10 by actuator 30. When a force is transmitted by actuator 35 in a direction tending to shorten variable spacing diffraction grating 10, the force causes the individual vertical bars 12 and horizontal connectors 14 of variable spacing diffraction grating 10 to collapse in a spring like fashion, such that the spacing between vertical bars 12 decreases. Alternatively, if actuator 30 pulls on the end of the variable spacing diffraction grating 10, the spacing between the vertical bars 12 of variable spacing diffraction grating 10 increases. In this manner, since the angle of diffraction of light incident on a diffraction grating is a function of grating spacing, or distance between grating elements, the spacing between the vertical bars 12, or grating elements, of the variable spacing diffraction grating 10 may be adjusted so that light incident on the variable spacing diffraction grating 10 may be diffracted into various angles. Depending on the application for which the present invention is to be used, the variable spacing diffraction grating 10 may be reflective or it may be manufactured so that light will pass, or be transmitted, through variable spacing diffraction grating 10.

Figure 3:
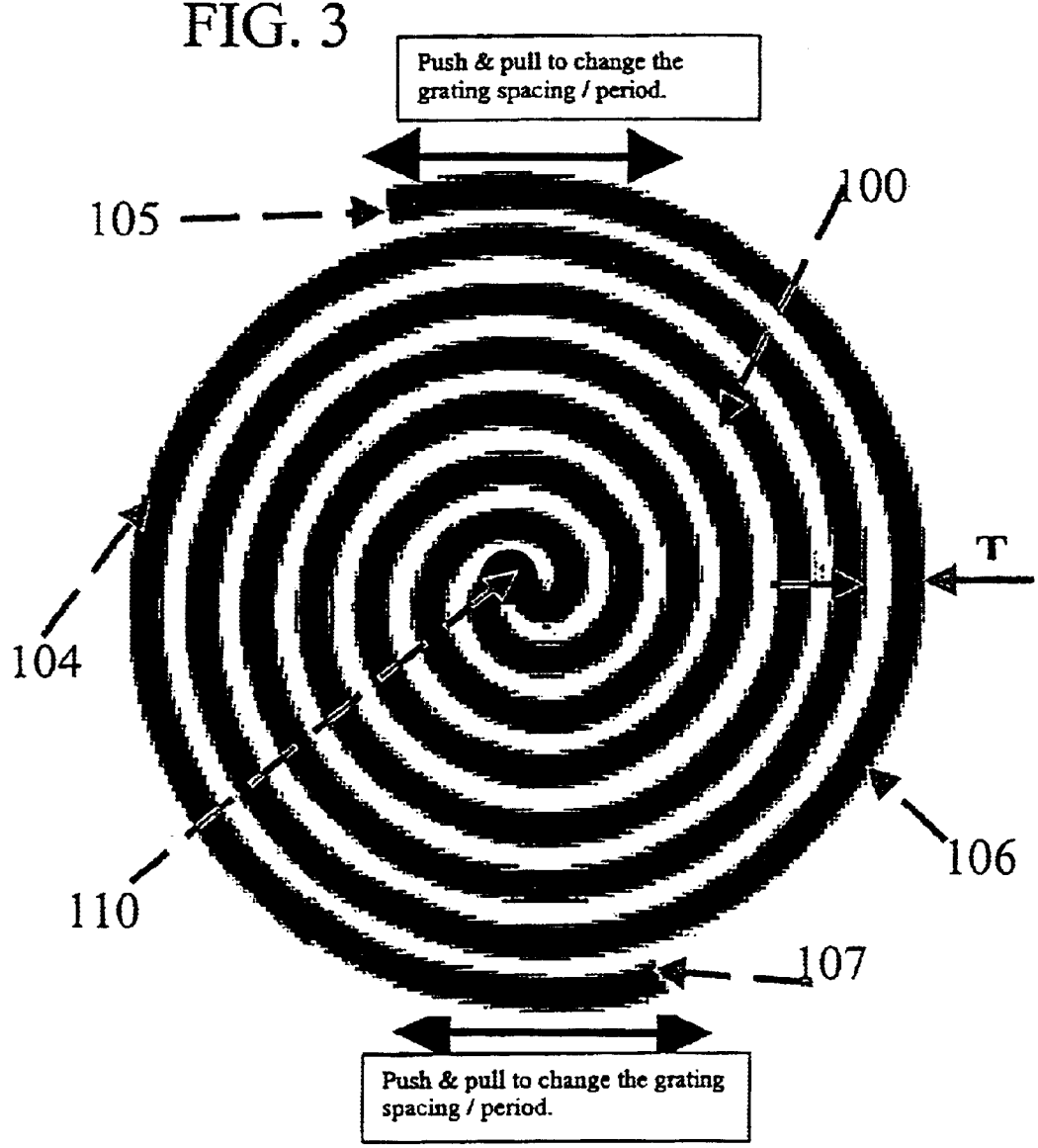
FIG. 3 is a two-dimensional top view of another embodiment of the variable spacing grating.

FIG. 3 presents another embodiment of the present invention in which the variable spacing diffraction grating 100 is formed in the shape of a spiral and is thus applicable to circular applications such as Fresnel lenses, diffractive optical elements, and holographic optical elements. In this embodiment, variable spacing diffraction grating 100 is formed having two spiral arms 104 and 106. Spiral arm 104 has a free end 105 and spiral arm 106 has a free end 107. Spiral arms 104 and 106 are formed so that the respective spiral arms wrap around each other, with the non-free ends of spiral arms 104 and 106 being joined together at location 110. In this manner, spiral arms 104 and 106 form the elements of variable spacing diffraction grating 100.

The spacing T between spiral arms 104 and 106 of the variable spacing diffraction grating 100 may be changed by pushing or pulling on either one or both free ends 105, 107 using an actuator (not shown) such as is described above with reference to FIGS. 1 and 2. Typically, where only one of free ends 105, 106 of one of spiral arms 104, 106 is actuated, the non-actuated free end of spiral arms 104, 106 is fixed, although, depending on the application this is not necessary to the satisfactory function of variable spacing diffraction grating 100. Pushing or pulling on one or both of free ends 105, 107 of spiral arms 104, 106 causes the spiral to tighten or loosen respectively, which increases or decreases the spacing between spiral arms 104, 106, as measured radially from the center of the spiral. The variable spacing between spiral arms 104, 106 allows variable spacing diffraction grating 100 to be adjusted using the actuator or actuators to diffract incident wavelengths into varying angles. Thus, spiral arms 104, 106 function as optical lenses or mirrors with focal lengths that may be continuously changed over the design range of the variable spacing diffraction grating 100.

Although variable spacing diffraction grating 100 is depicted in FIG. 3 as having only two spiral arms 104, 106, variable spacing diffraction grating 100 may have additional spiral arms depending on the requirements of the particular application for which variable spacing diffraction grating 100 is designed. As with the embodiment depicted in FIG. 1, spiral arms 104, 106 may be triangular in shape, or spiral arms 104, 106 may be formed having other shapes as needed to satisfy the requirements of the application for which variable spacing diffraction grating 100 is designed.

Figure 4:
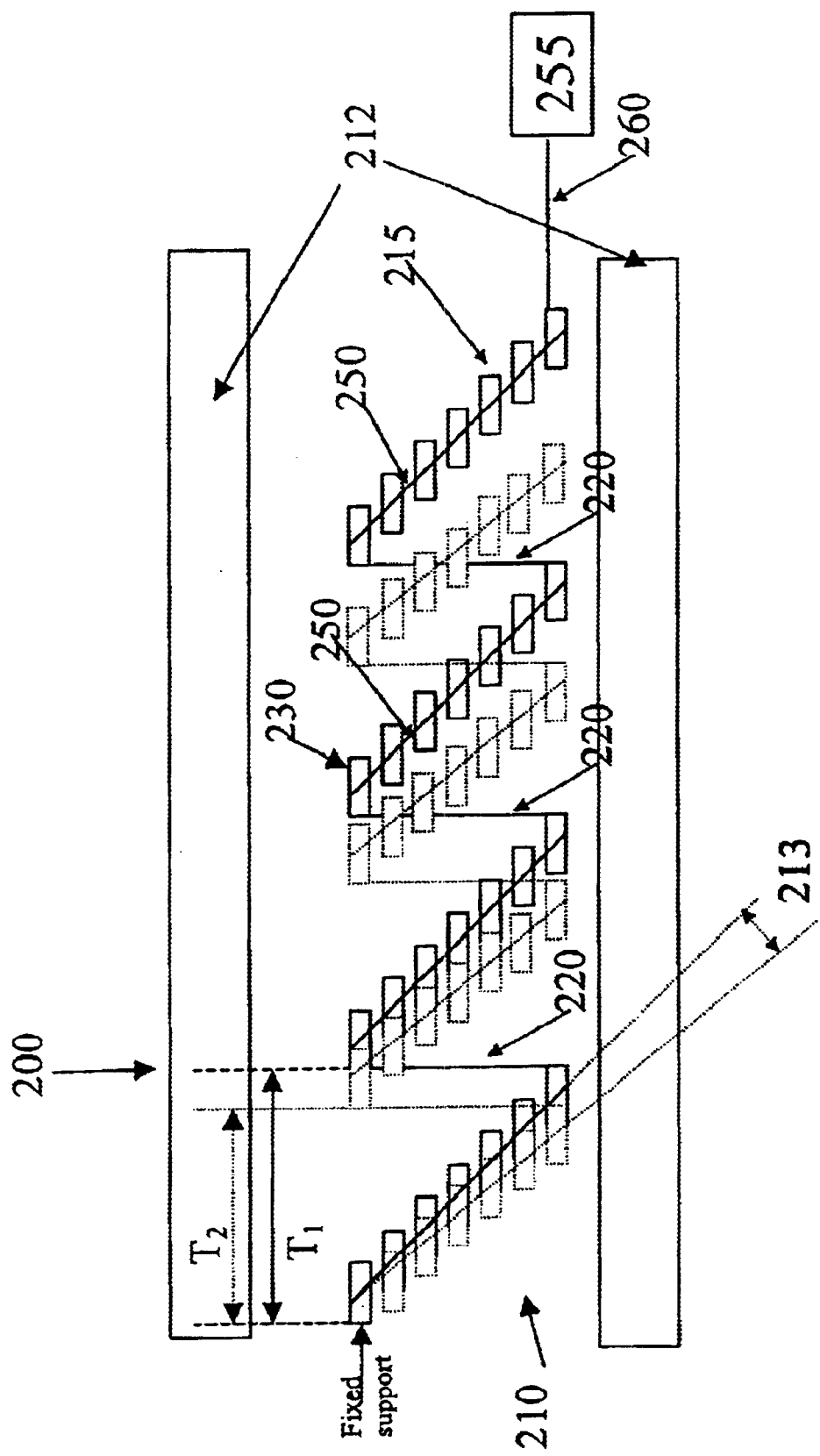
FIG. 4 is a schematic cross-sectional view of yet another embodiment of the variable spacing diffraction grating of the present invention depicting the grating utilizing a stair-step design.

Yet another alternative embodiment of the present invention is depicted in FIG. 4 which shows a "staircase" diffraction grating 200 incorporating an embodiment of the variable spacing diffraction grating of the present invention identified by reference numeral 210. The variable spacing diffraction grating 210 is typically mounted or formed between a two sheets 212 of transparent material.

In this embodiment, variable spacing diffraction grating 210 comprises a series of staircases 215 that are connected together by rods 220. Each staircase 215 includes a number of steps 230 connected together by several small rods 250 that pass through holes machined in each step 230 and are fixedly fastened to the top and bottom steps 230 of a staircase 215. As shown in FIG. 4, the variable spacing diffraction grating 210 consists of a number of staircases 215, the number of which is dependent upon the application for which the variable spacing diffraction grating 210 is to be used. The holes machined in the steps are slightly oversized to allow movement of the steps 230, and thus staircases 215, into desired positions to change the diffraction characteristics of the grating.

Each step 230 in one staircase 215 may be offset from an adjacent step 230 by a predetermined amount which depends upon the overall characteristics of the grating that are desired. The bottom step 230 of each staircase 215 is connected to the top step 230 of an adjacent staircase 215 by small rod 220. As should also be apparent from FIG. 4, the distance between staircases 215, as well as the offset angle of the steps 230 of adjacent staircases 215, may be varied as necessary to provide a grating having the desired spacing and optical characteristics.

In variable spacing diffraction grating 210, each staircase 215 may have an initial position identified as T1. As with previous embodiments, the variable spacing diffraction grating 210 depicted in FIG. 4 may be attached to an actuator 255, either directly or through a linkage 260, at one end of variable spacing diffraction grating 210 for moving the staircase elements of the spacing either closer or farther apart to change the spacing, or period, of the grating. The end of variable spacing diffraction grating 210 that is not connected to actuator 255 may be either fixed, or connected to another actuator (not shown).

When force is applied to variable spacing diffraction grating 210 by actuator 255 to, for example, pull the staircases 215 of variable spacing diffraction grating 210 farther apart, the spacing between staircases increases, as indicated by T2. It should be apparent, and as is depicted in the drawing, that moving the staircases in this manner changes the angle 213 of rod 220 between positions T1 and position T2. This angle constitutes the "blaze" angle for variable spacing diffraction grating 210. The blaze angle of a grating in standard diffraction grating theory is the angle formed between the grating normal and the facet normal.

The blaze angle determines the efficiency with which light of various wavelengths is diffracted into various angles, as is well known in the art.

Whether or not the top step 230 of the first staircase 215 is fixedly attached to a substrate or is attached to another actuator, the angle change of rod 220 as the staircase 215 is pulled from position T1 to position T2 is the same for all adjacent staircases 215. Thus, as shown by FIG. 4, the spacing between adjacent staircases 215 changes uniformly for all staircases 215 of the variable spacing diffraction grating 210.

The variable spacing diffraction grating of the present invention could be incorporated in a miniature spectrometer apparatus where spectrometer set up, size, space, and simplicity are critical factors. A variable spacing diffraction grating design on the scale described above would greatly minimize the space required in the spectrometer to accommodate the grating. The variable spacing diffraction grating of the present invention may be mounted using any of the geometries known in the art. Particularly useful is the Littrow mounting, which maximizes efficiency because all of the energy incident on the grating strikes the blazed facet of the grating. In a Littrow mounting, the incident energy propagates back towards the source. The Littrow angle is the same as the blaze angle of the grating. Control of the variable spacing diffraction grating may also be simplified and automated by computer control of the actuators used to change the grating spacing.

The variable spacing diffraction grating of the present invention may also be incorporated into a tunable laser cavity. Conventional gratings are used in laser cavities to tune a laser to a specific wavelength, usually by manual rotation of the grating. Use of the variable spacing diffraction grating in the tunable laser cavity would simplify control of the wavelength selections by application of a pre-calibrated actuation and allow for rapid and automated sequencing between lasing lines.

Alternative embodiments of the present invention are possible and include variations in the configuration of the arms that establish the ruling of the variable spacing diffraction grating. The variable spacing diffraction grating of the present invention may be formed with a variety of arm widths and spacings between the arms or beams. For example, these variations include but are not limited to, beams spaced half a beam width apart, a quarter of a beam width apart, and twice the beam width apart. Varying the arm or beam width and size will allow various embodiments of the present invention to be used in a variety of applications.

As described previously, the variable spacing diffraction grating of the present invention may also be used in fiber optic telecommunications devices. One typical application in this field utilizes a diffraction grating in a dense wavelength division multiplexer to separate a single light beam carrying multiplexed signals into separate light beams, each carrying a single signal. Typically, the incoming multiplexed light beam may be constituted from a plurality of wavelengths. Thus, the dense wavelength division multiplexer separates the light beam into a number of beams having only a single wavelength.

Figure 5:
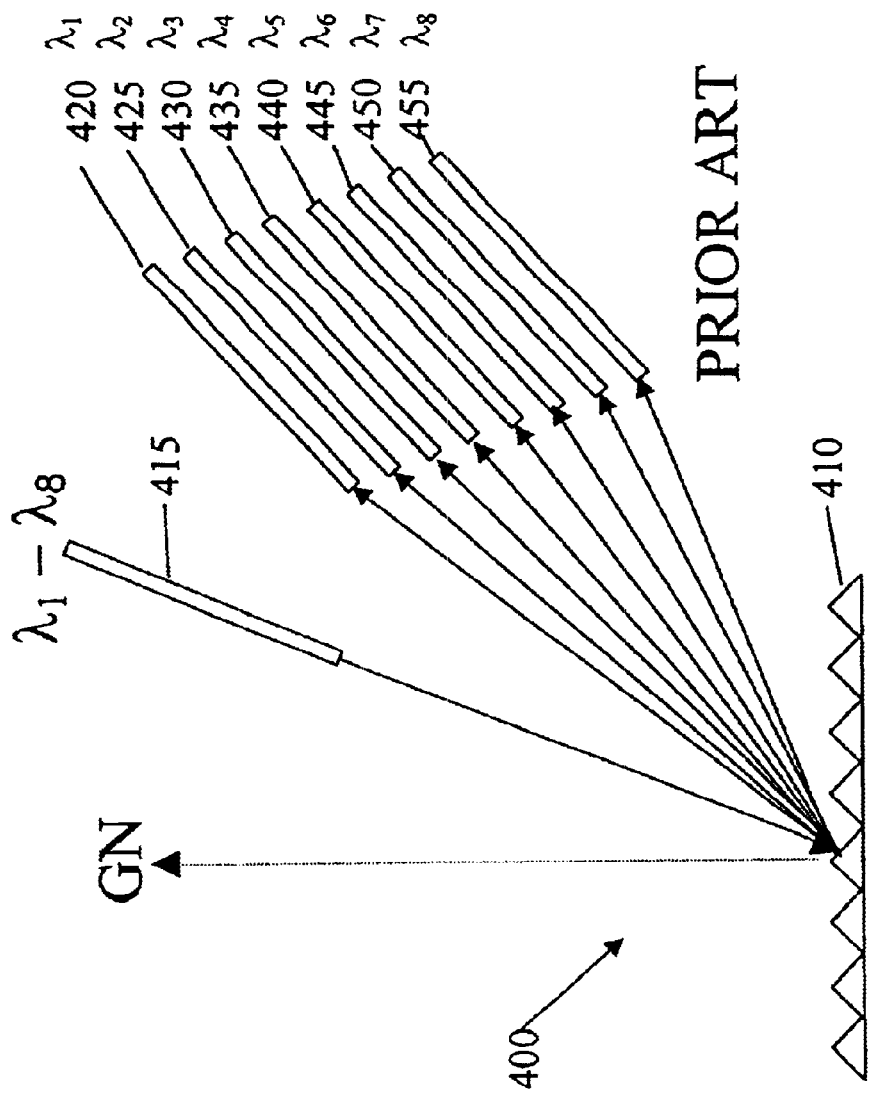
FIG. 5 is a schematic view of a prior art dense waveform division multiplexer optical fiber device used in a telecommunication network.

FIG. 5 depicts a prior art dense wavelength division multiplexer. In the device shown, a light beam comprised of light having wavelengths $\lambda 1-\lambda 8$ is carried by waveguide 415 and is directed at prior art diffraction grating 410 having a fixed grating spacing. The symbol GN refers to the "grating normal" of the grating, and is used as a reference when determining the diffraction angle of the grating. As is seen from FIG. 5, the diffraction grating 410 diffracts the light from waveguide 415 into eight separate light beams according to wavelength. As described previously, since the diffraction angle of a diffraction grating is a function of the wavelength of the light being diffracted, each wavelength of light is diffracted at a different angel. In this manner, light having wavelength $\lambda 1$ is diffracted at an angle sufficient to direct the light into waveguide 420, light having wavelength $\lambda 2$ is diffracted at a different angle into waveguide 425, and so forth. One disadvantage of this prior art device is that the diffraction angle is set at the factory for a particular range of wavelengths. Thus, in systems using a different range of wavelengths, a different device must be used, thus necessitating an inventory of devices covering different wavelength ranges.

Figure 6:
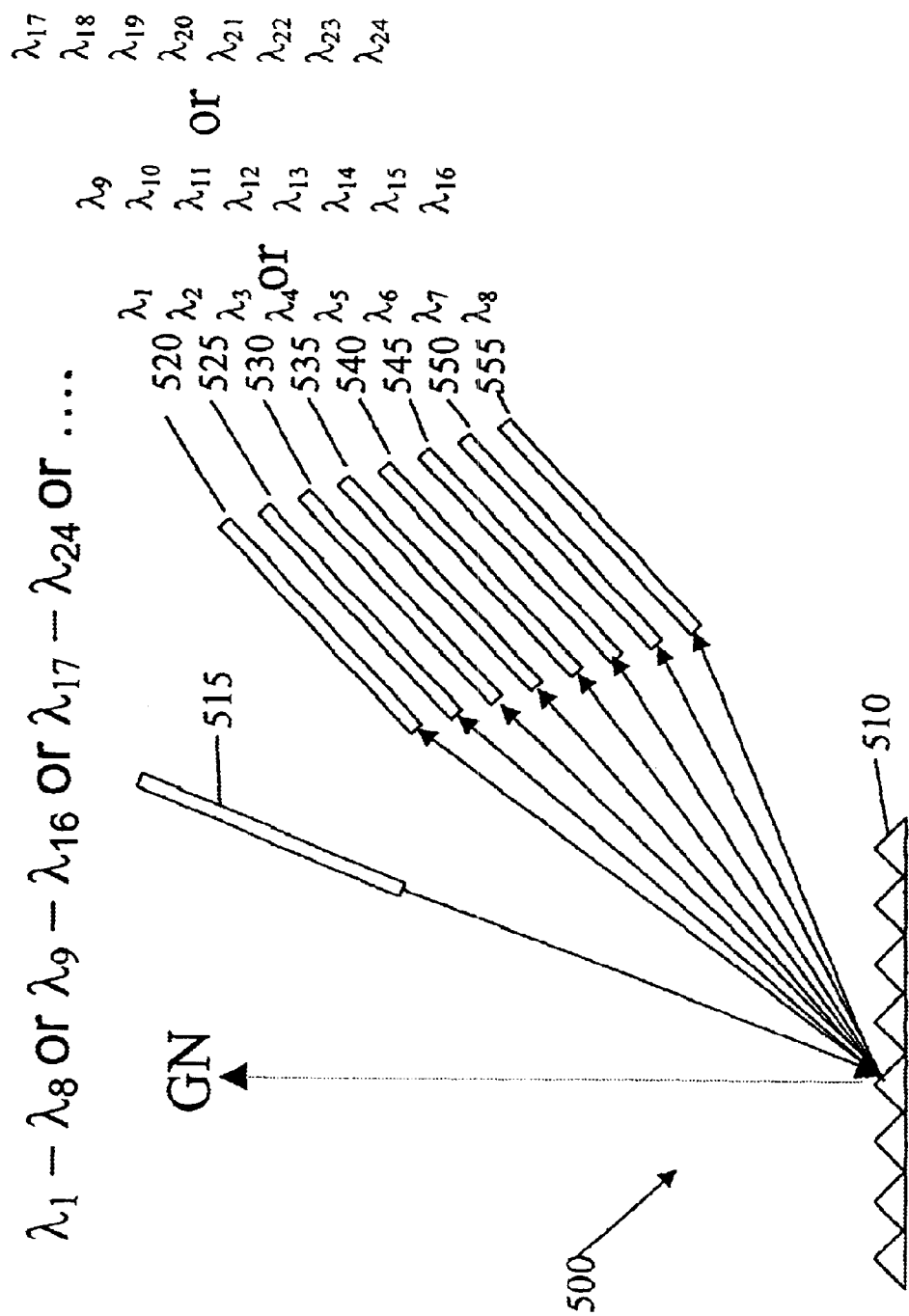
FIG. 6 is a schematic view of a reconfigurable dense waveform division multiplexer for use in a telecommunication network incorporating the present invention as illustrated in FIGS. 1–4.

The variable spacing diffraction grating of the present invention, however, addresses this problem and reduces the number of different dense wavelength division multiplexers required to cover various wavelengths. For example, as shown in FIG. 6, a reconfigurable dense wavelength division multiplexer 500 may be constructed using variable spacing diffraction grating 510. In this embodiment, the spacing of the elements of the variable spacing diffraction grating 510 may be changed as described above so that a single reconfigurable dense wavelength division multiplexer 500 may be used with light having multiplexed wavelengths of $\lambda 1-\lambda 8$, $\lambda 9-\lambda 16$, $\lambda 17-\lambda 24$ and so forth. Thus, using variable spacing diffraction grating 510, multiplexed light from waveguide 575 incident upon variable spacing diffraction grating 510 may be diffracted into waveguides 520–555. Different ranges of wavelengths, such as $\lambda 1-\lambda 8$ or $\lambda 9-\lambda 16$ may be diffracted into waveguides 520–555 by simply adjusting the spacing of the variable spacing diffraction grating 510 to accommodate the different wavelength range.

Figure 7:
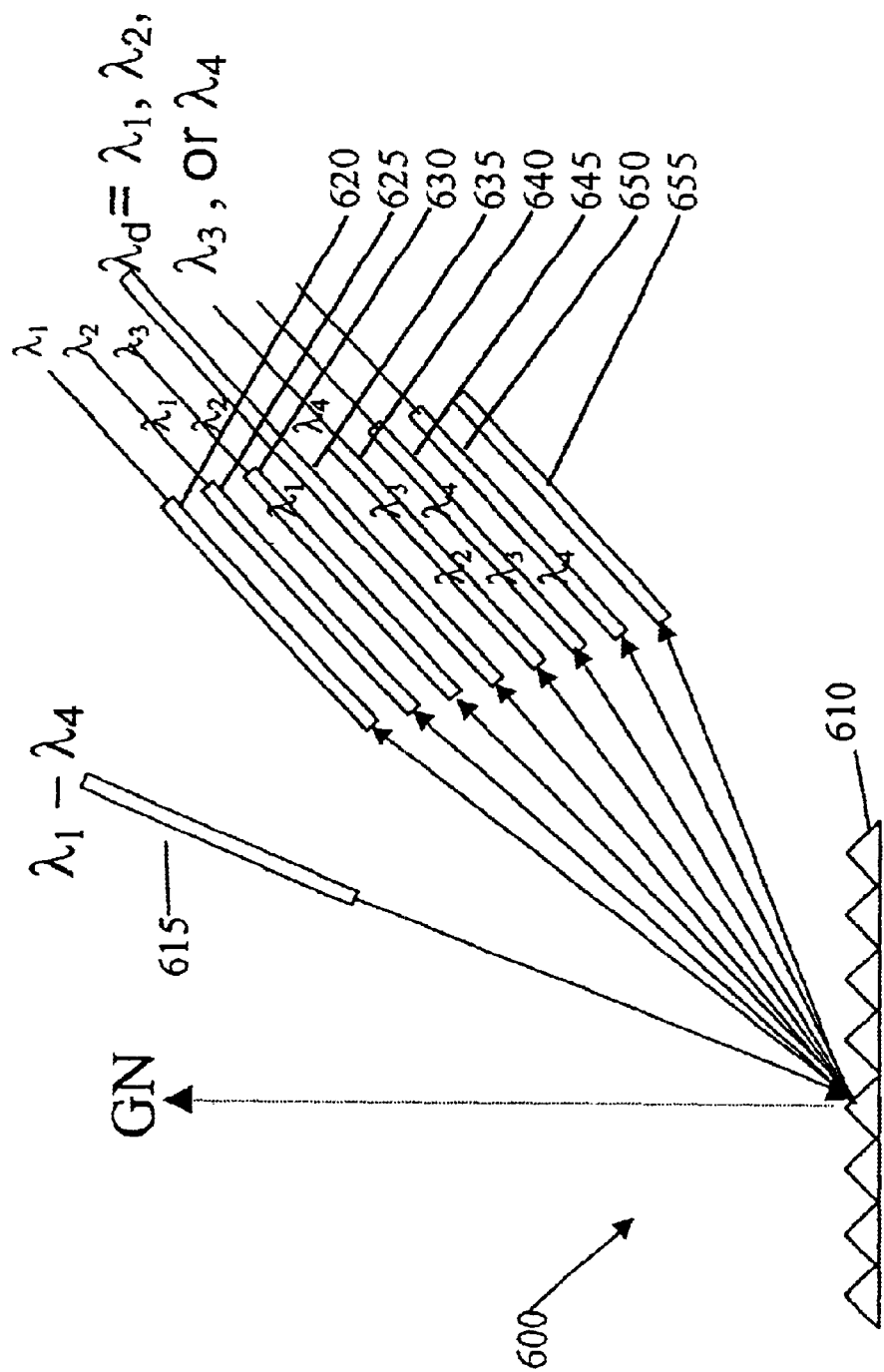
FIG. 7 is a schematic view of a channel selectable wavelength add/drop module for use in a telecommunication network incorporating the present invention as illustrated in FIGS. 1–4.

Similarly, the variable spacing diffraction grating of the present invention may be used to provide a channel selectable wavelength add/drop module 600, as is depicted in FIG.7. Such a device may be used in a telecommunications network where it necessary to drop one of the wavelengths of light that is multiplexed into a light beam, and where it is desired to direct the wavelength to be dropped into a specific fiber optic waveguide.

As is shown in FIG. 7, fiber optic waveguide 615 directs lights comprised of wavelengths $\lambda 1-\lambda 4$ at variable spacing diffraction grating 610. As described previously, the diffracted light is directed at fiber optic wave guides 620–655, depending on the wavelength of the diffracted light. In this example, light with wavelength $\lambda d$, in this case, $\lambda 4$, is to be dropped. By this it is meant that light having wavelength $\lambda d$ is to be directed into a specific fiber optic waveguide, such as waveguide 635. In this device, the waveguide above waveguide 635, that is, waveguide 630, will receive light having wavelength $\lambda d-1$, or $\lambda 3$, and waveguide 640, the waveguide below waveguide 635, will receive light having wavelength $\lambda d+1$, or $\lambda 1$. By varying the spacing of variable spacing diffraction grating 610, the device may be adjusted to change the dropped wavelength and to direct the dropped wavelength into a different one of waveguides 630–655. This adjustability allows one device to accommodate a range of requirements that previously would have required different devices for each dropped wavelength.

Figure 8:
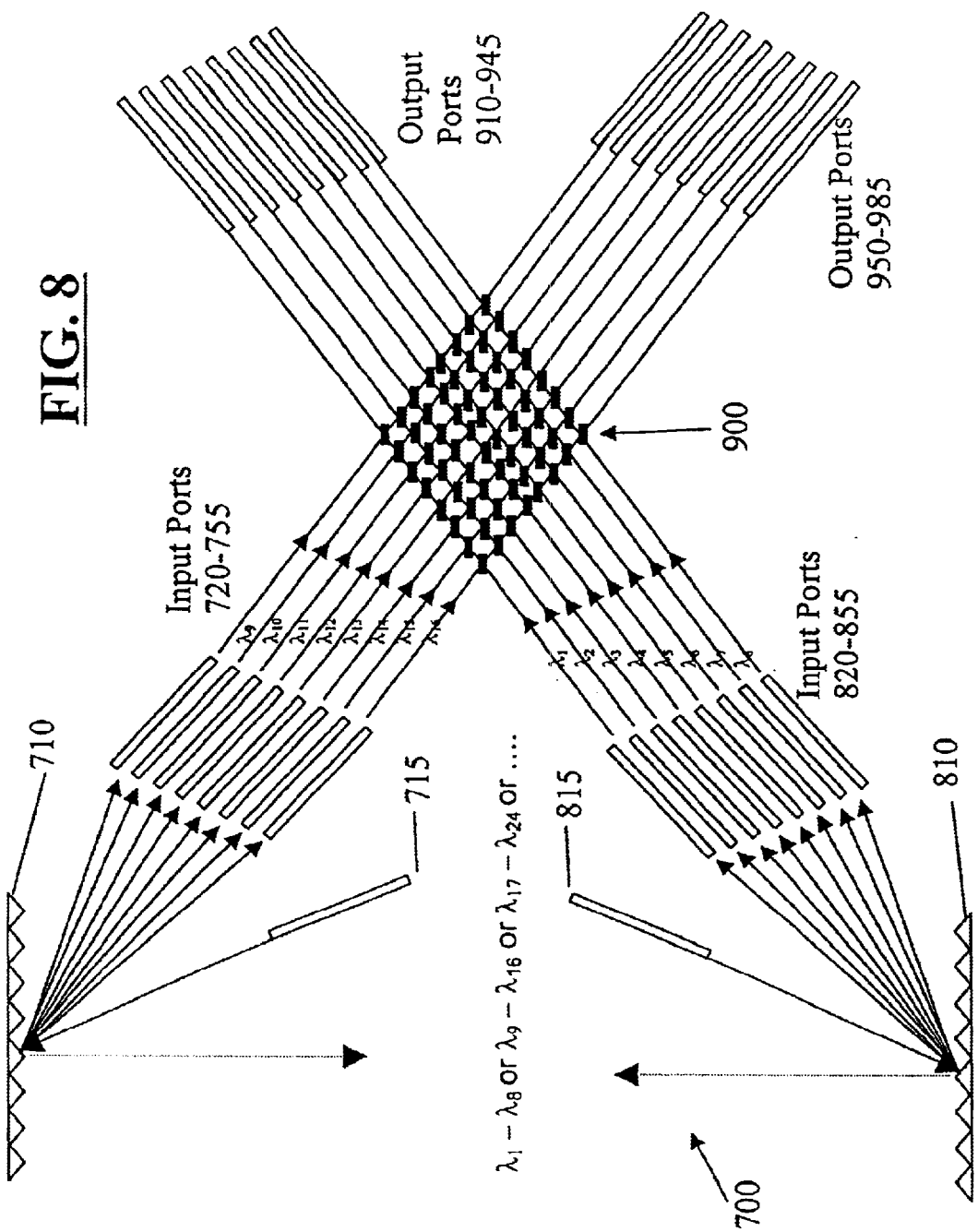
FIG. 8 is a schematic view of a wavelength selectable optical cross-connect for use in a telecommunication network incorporating the present invention as illustrated in FIGS. 1–4.

FIG. 8 depicts yet another device for use with fiber optic telecommunications incorporating the variable spacing diffraction grating of the present invention. In this embodiment, a wavelength selectable optical cross-connect 700 is provided that utilizes a pair of variable spacing diffraction gratings 710, 810. Multiplexed light from fiber optic waveguide 715 is directed at variable spacing diffraction grating 710 and is diffracted into cross-connect input ports 720–755. Similarly, multiplexed light from fiber optic 815 is directed at variable spacing diffraction grating 810 and is diffracted into cross-connect input ports 820–855. As described above, variable spacing diffraction gratings 710, 810 may be adjusted so that any range of input wavelengths may be accommodated without requiring replacement of the gratings. In this manner, using techniques well known in the art of cross-connecting devices, any wavelength of light may be directed into any input port 720–755 and may be directed through crossing 900 to any cross-connect output port 910–945 or 950–85. This arrangement provides a flexible cross-connect that may be used with different ranges of light wavelengths.

The variable spacing diffraction grating of the present invention may be typically fabricated using MEMS processing techniques for micro-machining devices out of silicon or other semiconductor materials that are well known in the art. For example, a variable spacing diffraction grating embodying the principles of the present invention may be machined from silicon using an appropriate combination of photolithography and electron or ion beam machining techniques well known in the semiconductor industry.

Current MEMS processing techniques are capable of producing features, such as the arms of the variable spacing diffraction grating, on the scale of 1–2 microns in size. The most critical dimension in the operation of a diffraction grating is the width of the arm or beam, which defines the ruling or grating spacing and determines the resolution of the grating. Thus, a variable spacing diffraction grating having feature sizes on the 1–2 micron scale comparable with medium resolution (600 to 1200 grooves/millimeter) conventional optical grating may presently be produced. A variable spacing diffraction grating having this resolution is ideal for the visible and near-infrared region of the electromagnetic spectrum and higher wavelengths, as well.

The design of the variable spacing diffraction grating of the present invention may be scaled to include wider beam and grating spacings to be useful in applications in the infrared region of the electromagnetic spectrum. As MEMS processing techniques are refined to allow smaller feature sizes, variable spacing diffraction gratings capable of functioning below visible wavelengths in the ultraviolet region of the electromagnetic spectrum will become possible, and are intended to be encompassed by this disclosure.

MEMS batch fabrication processes may be used to inexpensively produce the variable spacing diffraction grating of the present invention. Moreover, variable spacing diffraction gratings may also be produced at the same time or in the same production batch as other micro electro-optical machines (MEOMS) and other types of MEMS on the same substrate to make MEOMS/MEM systems. As will be apparent to those skilled in the art, this capability may greatly reduce the size and cost of optical systems for many applications, such as sensors, fiber optic devices for telecommunications, video display systems, medical diagnostic sensors and other devices that utilize such diffraction gratings.

While several particular forms of the invention have been illustrated and described, it will be apparent that various modifications can be made without departing from the spirit and scope of the invention. Accordingly, it is not intended that the invention be limited, except by the appended claims.

What is claimed is:

1. A diffraction grating having variable spacing, comprising:

a substrate; and a plurality of coplanar diffraction beams movably disposed on the substrate such that the plurality of diffraction beams may move independently of the substrate, the plurality of diffraction beams forming a grating having a first end and a second end, the first end movable relative to the second end, each of the plurality of diffraction beams being separated from an adjacent diffraction beam by a first spacing, the plurality of diffraction beams being interconnected such that moving the first end of the grating changes the separation within the plane of the grating between each of the plurality of diffraction beams from the first spacing to a second spacing.

2. The grating of claim 1 further comprising:

an actuator operatively joined to the first end of the grating, the actuator applying a mechanical force to the first end of the grating to change the spacing between each of the plurality of diffraction beams of the grating from the first spacing to the second spacing.

3. The grating of claim 2, wherein the beam width is about 1 micron.

4. The grating of claim 1, wherein the beams have a width.

5. A variable spacing diffraction grating, comprising:

a plurality of coplanar beam arms movably disposed on a substrate such that the plurality of coplanar beam arms may move independently of the substrate, the beam arms arranged adjacent to one another in a spiral, each beam arm having a first end and a free end and separated from adjacent beam arms by a first spacing, the first ends of the beam arms being interconnected at a location approximately at the center of the spiral, the plurality of coplanar beam arms arranged such that moving the free end of one of the beam arms relative to the other beam arm changes the spacing between the beam arms within the plane of the beam arms from the first spacing to a second spacing.

6. The variable spacing diffraction grating of claim 5, further comprising:

a mechanical actuator operably connected to the free end of at least one beam for changing the spacing between the beam arms from the first spacing to a second spacing.

7. A method for varying the spacing in a variable spacing diffraction grating, comprising:

disposing a series of interconnected coplanar beams separated by an initial distance on a substrate such that the coplanar beams may move independently of the substrate, the initial distance defining a first diffraction angle; and applying a force to one end of the series of interconnected beams such that the distance between each of the beams changes within the plane of the beams from the initial distance to a second distance, the second distance defining a second diffraction angle.

8. A filter for separating wavelengths of light from a beam of light; comprising:

an input for receiving a light beam including light having a range of wavelengths;

a diffraction grating mounted in the optical path of the received light beam, the diffraction grating having a plurality of interconnected coplanar beams mounted on a substrate such that the coplanar beams may move independently of the substrate, each of the interconnected beams being separated from an adjacent one of the plurality of interconnected beams by a space having a variable size, the diffraction grating configured to diffract different wavelengths of light depending upon the size of the variable space, the size of the space within the plane of the beams between each adjacent interconnected beam of the plurality of interconnected beams being variable dependant on a mechanical force applied to one of the plurality of interconnected beams, such that the diffraction grating is capable of diffracting the received light beam into its constituent wavelengths such that each constituent wavelength is diffracted at a selected diffraction angle; and output ports disposed for receiving selected constituent wavelengths of light diffracted from the received light beam.

9. A diffraction grating having continuously variable spacing, comprising:

a plurality of coplanar diffraction beams separated from each other by a first distance and interconnected to form a grating having a first end and a second end, the first end of the grating movable relative to the second end, such that moving the first end of the grating changes the separation between adjacent diffraction beams from the first separation to a second separation in the plane of the grating.

* * * * *